United States Patent [19]

Tokuyama

[11] Patent Number: 4,796,103

[45] Date of Patent: Jan. 3, 1989

[54] CONTROL PULSE RECORDING CIRCUIT FOR DUAL TAPE SPEED RECORDING AND REPRODUCING APPARATUSES USING TWO PAIRS OF HEADS SELECTIVELY FOR SELECTED SPEED INCLUDING RECORDING DELAYED CONTROL PULSES

[75] Inventor: Yoshio Tokuyama, Yokohama, Japan

[73] Assignee: Victor Company of Japan Ltd., Kanagawa, Japan

[21] Appl. No.: 870,250

[22] Filed: Jun. 2, 1986

[30] Foreign Application Priority Data

Jun. 3, 1985 [JP] Japan ............................... 60-119999
Jun. 4, 1985 [JP] Japan ............................... 60-121168

[51] Int. Cl.⁴ .......................................... H04N 5/783
[52] U.S. Cl. .................... 360/10.3; 358/335; 360/10.1; 360/64; 360/70
[58] Field of Search ............. 360/10.3, 33.1, 36.1, 360/64, 70, 78, 10.1, 10.2, 27; 358/310, 335, 312, 337

[56] References Cited

U.S. PATENT DOCUMENTS

| | | | |
|---|---|---|---|
| 3,942,042 | 3/1976 | Nikami | 360/64 X |
| 3,982,277 | 9/1976 | Naylor | 360/36.1 X |
| 4,307,417 | 12/1981 | Tokuyama | 360/33.1 X |
| 4,503,470 | 3/1985 | Mita et al. | 360/33.1 |
| 4,600,952 | 7/1986 | Igata et al. | 360/10.3 |
| 4,600,953 | 7/1986 | Furuhata et al. | 360/64 X |
| 4,605,976 | 8/1986 | Ito et al. | 360/70 |
| 4,623,940 | 11/1986 | Matsumoto et al. | 360/64 X |
| 4,630,136 | 12/1986 | Ogawa et al. | 360/64 X |

Primary Examiner—Raymond F. Cardillo
Assistant Examiner—W. R. Young
Attorney, Agent, or Firm—Michael N. Meller

[57] ABSTRACT

A control pulse recording circuit for a magnetic recording and reproducing apparatus having standard and expanded play modes, comprising an oscillator for generating a predetermined signal having a predetermined frequency which is higher than that of the vertical synchronizing signal of a video signal; a counter for counting the predetermined signal to produce a 30 Hz signal when a counted value in the counter reaches a threshold value with a timing which has been delayed by a predetermined time from every other vertical synchronizing signal in a recording mode; a circuit supplied with the 30 Hz signal for producing 30 Hz pulses; and control head circuitry for recording the 30 Hz pulses on a magnetic tape in the recording mode. The 30 Hz pulses are recorded on the magnetic tape with a timing delayed by a delay time from a timing of every other vertical synchronizing signal in both the standard and expanded play modes.

2 Claims, 15 Drawing Sheets

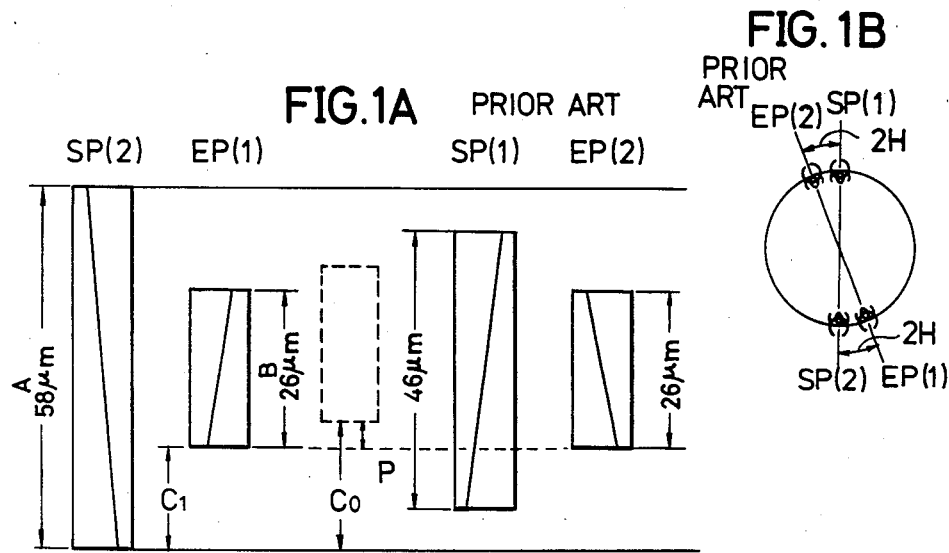
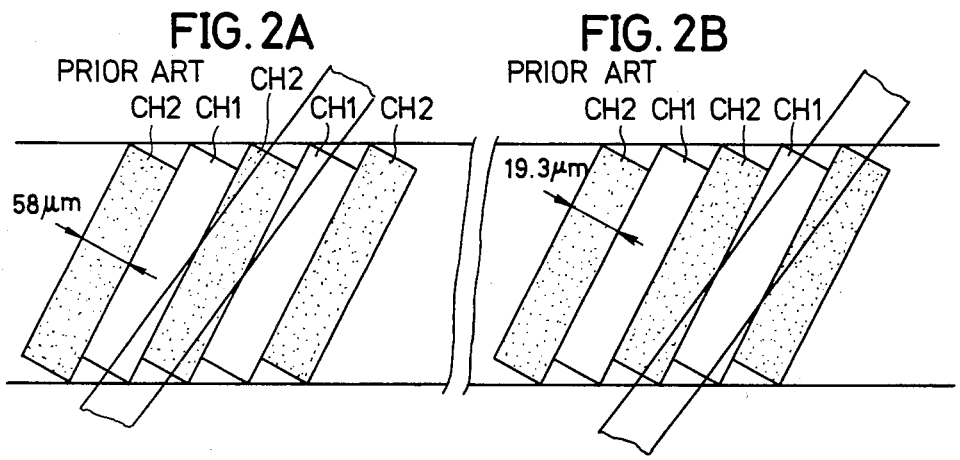
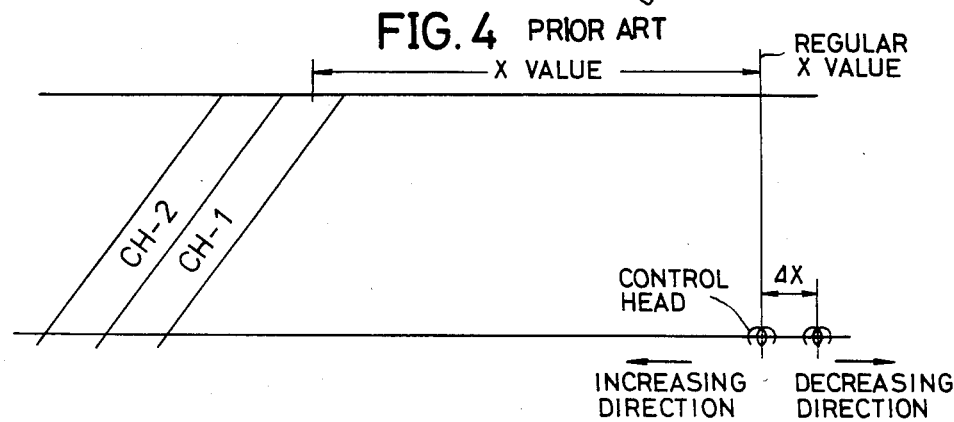

CONTROL PULSE RECORDING CIRCUIT FOR DUAL TAPE SPEED RECORDING AND REPRODUCING APPARATUSES USING TWO PAIRS OF HEADS SELECTIVELY FOR SELECTED SPEED INCLUDING RECORDING DELAYED CONTROL PULSES

BACKGROUND OF THE INVENTION

The present invention generally relates to control pulse recording circuits for magnetic recording and reproducing apparatuses, and more particularly to a control pulse recording circuit for recording control pulses in a double-gap system magnetic recording and reproducing apparatus.

A double-gap system magnetic recording and reproducing apparatus comprises two pairs of video heads, where each pair is constituted by video heads having gaps of mutually different azimuth angles. The two pairs of video heads are selectively used depending on a moving speed of a magnetic tape so as to record and reproduce a video signal on and from the magnetic tape. In the present specification, the video heads which are used in a standard play mode will be referred to as standard play heads, and the video heads which are used in an expanded play mode will be referred to as expanded play heads. For example, in the case where the magnetic tape is originally intended to provide two hours of play, it is possible to obtain two hours of play in the standard play mode and obtain six hours of play in the expanded play mode. When the relative height positions of the standard and expanded play heads from a reference height position are close the ideal relative height positions, it is necessary to shift the recording timing of the control pulses by one field (16.7 msec) with respect to rotational phase detection pulses between the standard and expanded play modes. The rotational phase detection pulses are obtained by detecting the rotational phase of a drum which is mounted with the video heads. Hence, in a conventional control pulse recording circuit, a signal which is used to form the control pulses for the standard play mode is delayed in a delay circuit so as to form the control pulses for the expanded play mode. For this reason, there are problems in that it is impossible to simplify the circuit construction of the control pulse recording circuit and the circuit is expensive.

An actual difference C1 between the relative height positions of the standard and expanded play heads does not become equal to an ideal difference C0 between the ideal relative height positions of the standard and expanded play heads. In other words, a difference $P = C0 - C1$ exists between the actual difference C1 and the ideal difference C0 with which an X-value becomes a designed value. The X-value is a distance on the magnetic tape from a control head to a video head which terminates a scan on the magnetic tape. For this reason, it is necessary to adjust the X-value in the standard and expanded play modes.

Conventionally, the position of the control head is adjusted so that the X-value becomes a regular value in the standard play mode. On the other hand, in the expanded play mode, an error in the X-value caused by the actual difference C1 is corrected electrically. That is, the position of the control head is adjusted so that the X-value becomes the regular value in the standard play mode, and the conventional circuit records the control pulses with the timing of the vertical synchronizing signal. Furthermore, in the expanded play mode, the conventional circuit records the control pulses with a timing delayed with respect to the timing of the vertical synchronizing signal, by use of a delay circuit. The delay circuit has a delay time of 29 msec which is relatively long, and is easily affected by inconsistencies in the temperature characteristic and the like thereof. In addition, there are problems in that a variable resistor is required to adjust the delay circuit and that the setting of the control pulse recording circuit must be changed between the standard and expanded play modes.

SUMMARY OF THE INVENTION

Accordingly, it is a general object of the present invention to provide a novel and useful control pulse recording circuit in which the problems described heretofore are eliminated.

Another and more specific object of the present invention is to provide a control pulse recording circuit which uses a 60 Hz oscillator circuit to obtain control pulses for standard and expanded play modes, without the use of a delay circuit. According to the control pulse recording circuit of the present invention, the circuit construction is simple compared to that of the conventional circuit, and the circuit is inexpensive.

Still another object of the present invention is to provide a control pulse recording circuit in which a delay time of a monostable multivibrator is set to a small value. According to the control pulse recording circuit of the present invention, the circuit is virtually unaffected by inconsistencies in a temperature characteristic and the like thereof. Furthermore, the setting of the control pulse recording circuit does not need to be changed between the standard and expanded play modes.

Other objects and further features of the present invention will be apparent from the following detailed description when read in conjunction with the accompanying drawings.

BRIEF DESCRIPTION OF THE DRAWINGS

FIGS. 1A and 1B respectively show arrangements of video heads of a double-gap system magnetic recording and reproducing apparatus;

FIGS. 2A and 2B respectively show track patterns on a magnetic tape for a still reproduction in standard and expanded play modes;

FIG. 4 is a diagram showing the relationship between the track pattern and a control head;

DETAILED DESCRIPTION

A double-gap system magnetic recording and reproducing apparatus uses standard play heads SP(1) and SP(2) shown in FIGS. 1A and 1B for recording and normal reproduction in the standard play mode. Expanded play heads EP(1) and EP(2) are used for the recording and normal reproduction in the expanded play mode. For example, the heads EP(2) and SP(1) are mounted on a rotary drum at positions deviated by 2H on the periphery of the rotary drum as shown in FIG. 1B, where H denotes one horizontal scanning period. Similarly, the heads EP(1) and SP(2) are mounted on the rotary drum at positions deviated by 2H on the periphery of the rotary drum. A magnetic tape moves at different speeds for the standard and expanded play modes, and the heads record and reproduce a video signal on and from the moving magnetic tape.

Figure 3:
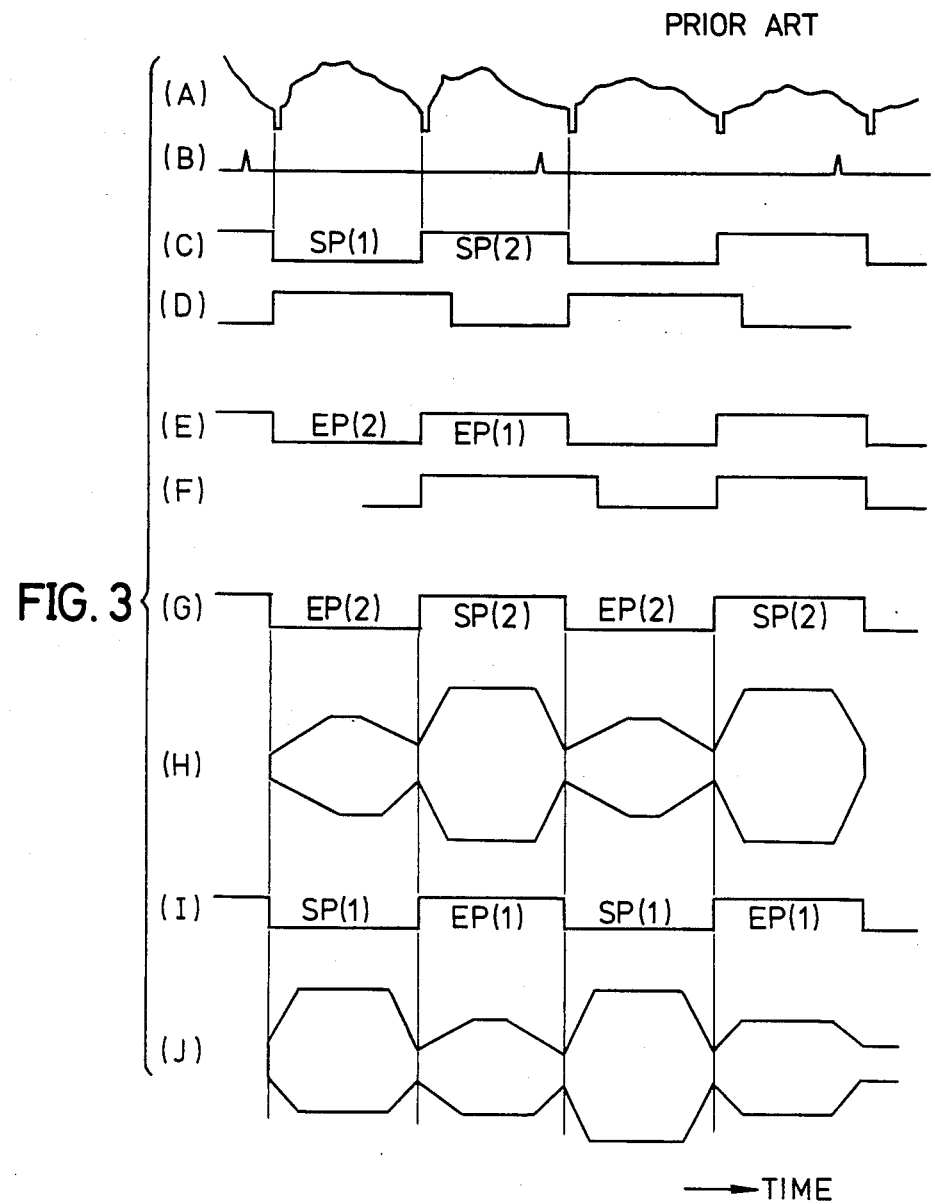
FIGS. 3(A) through 3(J) show signal waveforms for explaining the relationship between the control pulses and the switching of the video heads.

During a still reproduction in the standard play mode, the heads EP(2) and SP(2) having gaps of the same azimuth angle are used, as may be seen from FIGS. 2(A), 3(G) and 3(H). On the other hand, during a still reproduction in the expanded play mode, the heads EP(1) and SP(1) having gaps of the same azimuth angle are used, as may be seen from FIGS. 2(B), 3(I) and 3(J). FIGS. 3(G) and 3(I) show the switching timing of the heads, and FIGS. 3(H) and 3(J) show the reproduced FM signal level during the still reproduction. According to this apparatus, it is possible to obtain a high reproduced FM signal level during the still reproduction, and it is possible to obtain a more stable still picture (field still) compared to a frame still in both the standard and expanded play modes.

The X-value described before, that is, the distance on the magnetic tape from the control head to the video head, is set so as to achieve compatibility of the magnetic tapes. Hence, as shown in FIG. 4, the control pulse is recorded on the magnetic tape by the control head at the time when the first-channel video head reaches an entrance position where the magnetic tape begins to make contact with the rotary drum. Hence, according to the double-gap system, the time charts for the standard play mode become as shown in FIGS. 3(A), 3(B), 3(C) and 3(D), where FIG. 3(A) shows the video signal, FIG. 3(B) shows rotational phase detection pulses, FIG. 3(C) shows the timing with which the channels are switched and FIG. 3(D) shows the control pulses. The time charts for the expanded play mode become as shown in FIGS. 3(A), 3(B), 3(E) and 3(F), where FIG. 3(E) shows the timing with which the channels are switched and FIG. 3(F) shows the control pulses. The rotational phase detection pulses are produced from a known rotational phase detector (not shown) which is provided in a vicinity of the rotary drum. The rotational phase detection pulses are produced at a rate of once per revolution of the rotary drum.

When the position of the control head is adjusted so as to obtain the regular X-value in the standard play mode, there is a possibility that the X-value changes in the expanded play mode due to the relative height differences of the standard and expanded play heads. In the case where the difference in the relative height positions of the standard and expanded play heads with respect to a reference height position is C1 as shown in FIG. 1 and is close to an ideal difference C0 (for example, 14 microns) between ideal relative positions of the standard and expanded play heads, it is necessary to shift the recording timing of the control pulses by one field (16.7 msec) with respect to rotational phase detection pulses between the standard and expanded play modes, as may be seen from FIGS. 3(B), 3(D) and 3(F).

Figure 5:
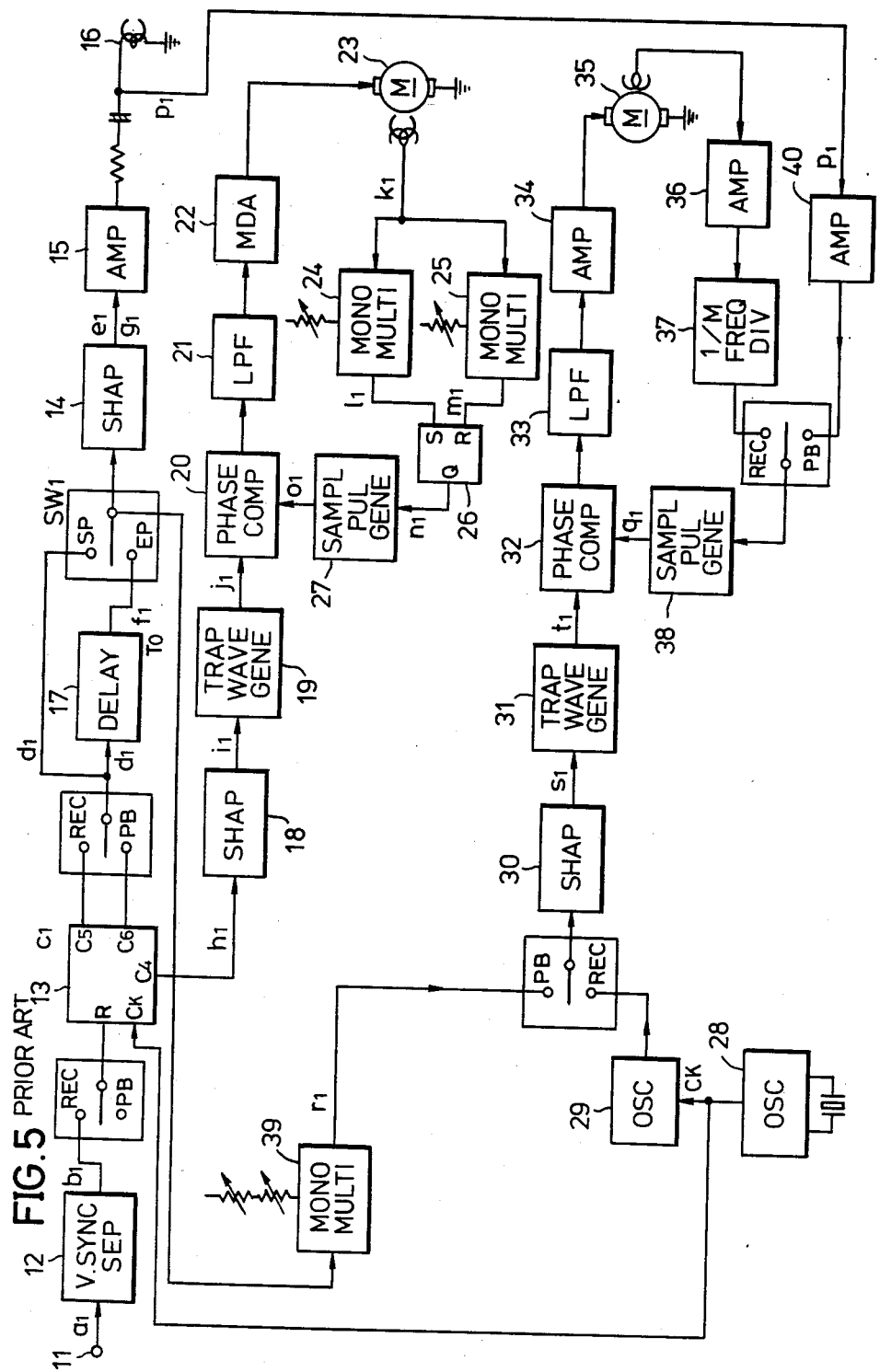
FIG. 5 is a system block diagram showing an example of the conventional control pulse recording circuit.
Figure 6:
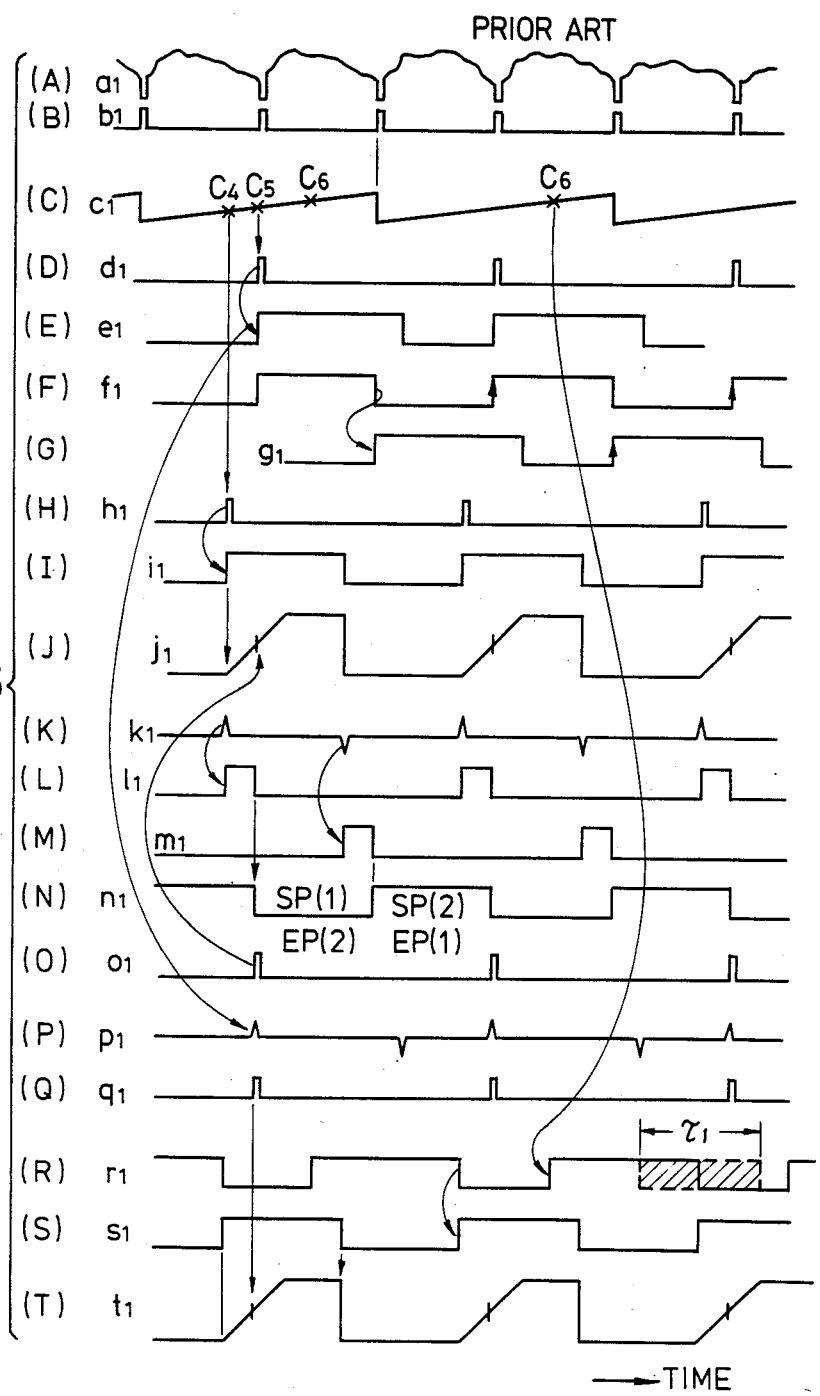
FIGS. 6(A) through 6(T) show signal waveforms for explaining the operation of the block system shown in FIG. 5.

FIG. 5 shows the block system of an example of the conventional control pulse recording circuit. Description will first be given with respect to the operation of the circuit in the recording mode. A video signal a1 shown in FIG. 6(A) is applied to a terminal 11 and is supplied to a vertical synchronizing signal separating circuit 12 wherein a vertical synchronizing signal b1 shown in FIG. 6(B) is separated. The separated vertical synchronizing signal b1 is supplied to a 30 Hz oscillator circuit (counter) 13 via a switch which is connected to a terminal REC in the recording mode. The oscillator circuit 13 produces a signal c1 shown in FIG. 6(C) from the vertical synchronizing signal b1, and counts clock pulses from a crystal oscillator 28. Threshold values C4, C5 and C6 are set in the oscillator circuit 13, and a signal d1 shown in FIG. 6(D) which is in synchronism with the vertical synchronizing signal b1 and has a frequency of 30 Hz is obtained from a terminal C5 thereof, where C4<C5<C5. A pulse is produced from the terminals C4, C5 and C6 of the oscillator circuit 13 when the counted value therein reaches the respective threshold values C4, C5 and C6. In the standard play mode, the signal d1 is supplied to a shaping circuit 14 via a switch SW1 which is connected to a terminal SP in the standard play mode, and an output signal e1 of the shaping circuit 14 shown in FIG. 6(E) is supplied to a control head 16 via a recording amplifier 15 and is recorded on a magnetic tape (not shown).

On the other hand, in the expanded play mode, the signal d1 is delayed by one field and is formed into a signal f1 shown in FIG. 6(F) in a delay circuit 17. The signal f1 is shaped into a signal g1 shown in FIG. 6(G) in the shaping circuit 14, and the signal g1 is supplied to the control head 16 via the recording amplifier 15 and is recorded on the magnetic tape.

In the drum servo system, a trigger pulse signal h1 shown in FIG. 6(H) from the terminal C4 of the oscillator circuit 13 is shaped into a signal i1 shown in FIG. 6(I) in a shaping circuit 18. The signal i1 is formed into a trapezoidal wave signal j1 shown in FIG. 6(J) in a trapezoidal wave generating circuit 19, and the trapezoidal wave signal j1 is supplied to a phase comparator 20. A rotational phase detection pulse signal k1 shown in FIG. 6(K) is obtained from a rotational phase detector which detects the rotational phase of a drum motor 23. The signal k1 is formed into a signal l1 shown in FIG. 6(L) in a monostable multivibrator 24, and is formed into a signal m1 shown in FIG. 6(M) in a monostable multivibrator 25. The signal l1 is supplied to a set terminal S of a flip-flop 26 and the signal m1 is supplied to a reset terminal R of the flip-flop 26, and a signal n1 shown in FIG. 6(N) is produced from the flip-flop 26. The signal n1 is formed into a sampling pulse signal o1 shown in FIG. 6(O) in a sampling pulse generating circuit 27.

The phase comparator 20 compares the phases of the trapezoidal wave signal j1 and the sampling pulse signal o1, and produces a phase error signal. The phase error signal is passed through a lowpass filter 21 and a motor driving amplifier 22, and the drum motor 23 is controlled by an output signal of the motor driving amplifier 22.

On the other hand, in a capstan servo system, the clock pulses from the crystal oscillator 28 is passed through capstan reference oscillator 29 and a switch which is connected to a terminal REC in the recording mode, and is supplied to a shaping circuit 30. A signal s1 shown in FIG. 6(S) is produced from the shaping circuit 30, and a trapezoidal wave generating circuit 31 generates a trapezoidal wave signal t1 shown in FIG. 6(T) from the signal s1. The trapezoidal wave signal t1 is supplied to a phase comparator 32. A rotational speed detection pulse signal is produced from a rotational speed detector which detects the rotational speed of a capstan motor 35. The rotational speed detection pulse signal is passed through an amplifier 36, a 1/M frequency divider 37 and a switch which is connected to a terminal REC in the recording mode, and is supplied to a sampling pulse generating circuit 38. The sampling pulse generating circuit 38 generates a sampling pulse signal q1 shown in FIG. 6(Q).

The phase comparator 32 compares the phases of the trapezoidal wave signal t1 and the sampling pulse signal q1, and produces a phase error signal. The phase error signal is passed through a lowpass filter 33 and a motor driving amplifier 34, and the capstan motor 35 is controlled by an output signal of the motor driving amplifier 34.

On the other hand, in the reproducing mode, a signal produced from a terminal C6 of the oscillator circuit 13 is passed through the switch which is connected to a terminal PB in the reproducing mode and is supplied to the terminal SP of the switch SW1 and to the delay circuit 17. A tracking monostable multivibrator 39 produces a signal r1 shown in FIG. 6(R) from an output signal of the switch SW1. Hence, the phase comparator 21 compares the phases of a trapezoidal wave signal formed from the signal r1 and a sampling pulse signal which is formed from reproduced control pulses p1 shown in FIG. 6(P). The capstan motor 35 is controlled responsive to a phase error signal produced from the phase comparator 32. The tracking monostable multivibrator 39 is designed to adjust the tracking error, and the signal r1 produced from the tracking monostable multivibrator 39 has a tracking variable range $\tau 1$.

The conventional circuit shown in FIG. 5 requires the delay circuit 17 in the control pulse recording system for providing the delay of one field between the control pulses e1 for the standard play mode and the control pulses g1 for the expanded play mode. For this reason, there is a problem in that the circuit is expensive.

The actual difference C1 between the relative height positions of the standard and expanded play heads SP(2) and EP(1) does not become equal to the ideal difference C0 between the ideal relative height positions of the standard and expanded play heads when the optimum design is employed for the slow-motion reproduction or the rotary audio heads. In other words, the difference P=C0−C1 exists between the actual difference C1 and the ideal difference C0 with which the X-value becomes the designed value. The X-value is a distance on the magnetic tape from a control head to a video head which terminates a scan on the magnetic tape. For this reason, it is necessary to adjust the X-value in the standard and expanded play modes.

The X-value needs to be adjusted in the standard and expanded play modes, but the position of the control head is generally adjusted in the standard play mode because only one control head is provided in the apparatus. First, recording and reproduction are carried out on the same apparatus and a preset variable resistor coupled in series to a tracking variable resistor of the tracking monostable multivibrator is adjusted so that in the reproducing mode the heads accurately scan the tracks which were formed in the recording mode. Next, a standard magnetic tape which has been pre-recorded with the regular X-value is played, and the position of the control head is adjusted so that the reproduced FM signal level becomes a maximum when the tracking variable resistor is set to a center position. For example, when a standard magnetic tape for the expanded play mode is played in the expanded play mode and the X-value for the expanded play mode is adjusted, the position of the control head must be adjusted within a range which is one third the adjusting range for the standard play mode, and it is extremely difficult to make such an adjustment.

For this reason, the position of the control head is adjusted so that the X-value becomes the regular value in the standard play mode, and in the expanded play mode, the error in the X-value caused by the actual difference C1 is corrected electrically. In other words, in the standard play mode, the conventional circuit adjusts the position of the control head so that the X-value becomes the regular value, and the control pulses are recorded with the timing of the vertical synchronizing signal.

If the control pulses were recorded in the standard play mode with a timing delayed by $t_{SP}$ with respect to the timing of the vertical synchronizing signal, the position of the control head provided on the downstream side of the rotary drum must be deviated by a distance L in a decreasing direction in FIG. 4 (that is, generally downward along the rotary axis of the rotary drum so that the height position decreases) from a position X0 of the regular X-value, in order to maintain the regular X-value on the magnetic tape. The distance L can be described by $L=(t_{SP}/2T0)\times A\times 2$ (microns), where A denotes one track pitch in microns in the standard play mode and T0 denotes one field period (16.7 msec). Hence, when a tape speed in the standard play mode is denoted by $V_{SP}$, the position of the control head must be deviated by a distance $\Delta X$ in the decreasing direction in FIG. 4. The distance $\Delta X$ can be described by the following equation.

$$\Delta X=(t_{SP}/2T0)\times [V_{SP}(\text{mm/sec})/30(\text{frames})](\text{mm})$$

When the control head is located at the position so that the mechanical X-value is described by $X=X0+\Delta X$ for the standard play mode, it is necessary to absorb the distance $\Delta X$ and the difference P (microns) in the expanded play mode. A delay time $t_{EP}$ for absorbing the distance $\Delta X$ and the difference P can be described by the following equation (1).

$$(t_{SP}/2T0) \times A \times 2 = (t_{EP}/2T0) \times (A/N) \times 2 + P \quad (1)$$

When the tape speed in the expanded play mode is denoted by $V_{EP}$ and a ratio of the tape speeds between the standard and expanded play modes is denoted by $1/N$ such that $A/N$ represents a track pitch in the expanded play mode, $V_{EP}=(1/N) \times V_{SP}$ and $N=3$.

Figure 7:
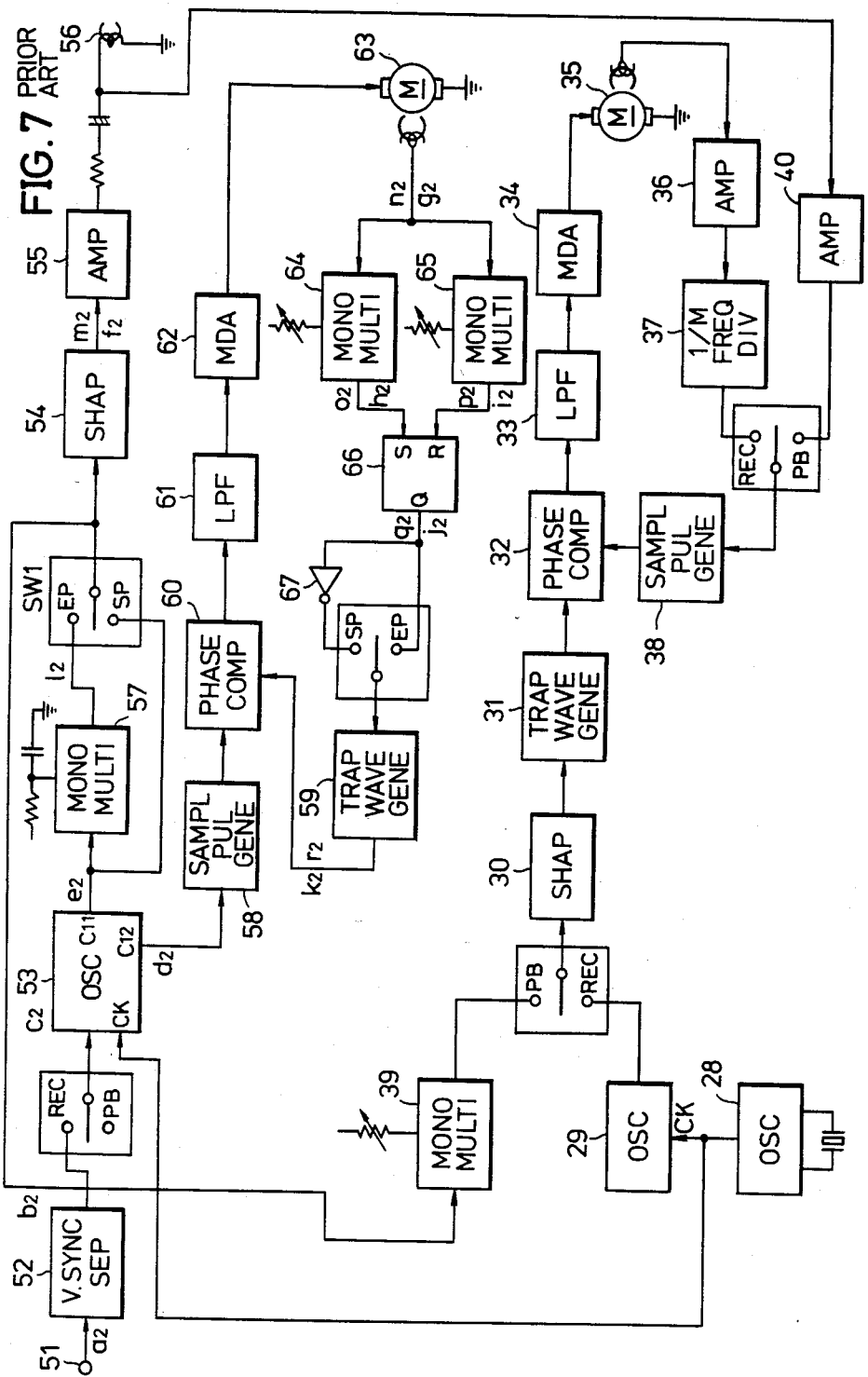
FIG. 7 is a system block diagram showing another example of the conventional control pulse recording circuit.

FIG. 7 shows the block system of another example of the conventional control pulse recording circuit. In FIG. 7, those parts which are the same as those corresponding parts in FIG. 5 are designated by the same reference numerals, and description thereof will be omitted. In the recording mode, a video signal a2 shown in FIG. 8(A) which is identical to the video signal a1 is applied to a terminal 51 and is supplied to a vertical synchronizing signal separating circuit 52 wherein a vertical synchronizing signal b2 shown in FIG. 8(B) which is identical to the vertical synchronizing signal b1 is separated. The separated vertical synchronizing signal b2 is supplied to a 30 Hz oscillator circuit (counter) 53 via a switch which is connected to a terminal REC in the recording mode. The oscillator circuit 53 produces a signal c2 shown in FIG. 8(C) from the vertical synchronizing signal b2, and counts clock pulses from the crystal oscillator 28. Threshold values C11 and C12 are set in the oscillator circuit 53, and a signal e2 shown in FIG. 8(E) which is in synchronism with the vertical synchronizing signal b2 and has a frequency of 30 Hz is obtained from a terminal C11 thereof, where C11<C12. A pulse is produced from the terminals C11 and C12 of the oscillator circuit 53 when the counted value therein reaches the respective threshold values C11 and C12. In the standard play mode, the signal e2 is supplied to a shaping circuit 54 via the switch SW1 which is connected to the terminal SP in the standard play mode, and an output signal f2 of the shaping circuit 54 shown in FIG. 8(F) is supplied to a control head 56 via a recording amplifier 55 and is recorded on a magnetic tape (not shown).

Figure 8:
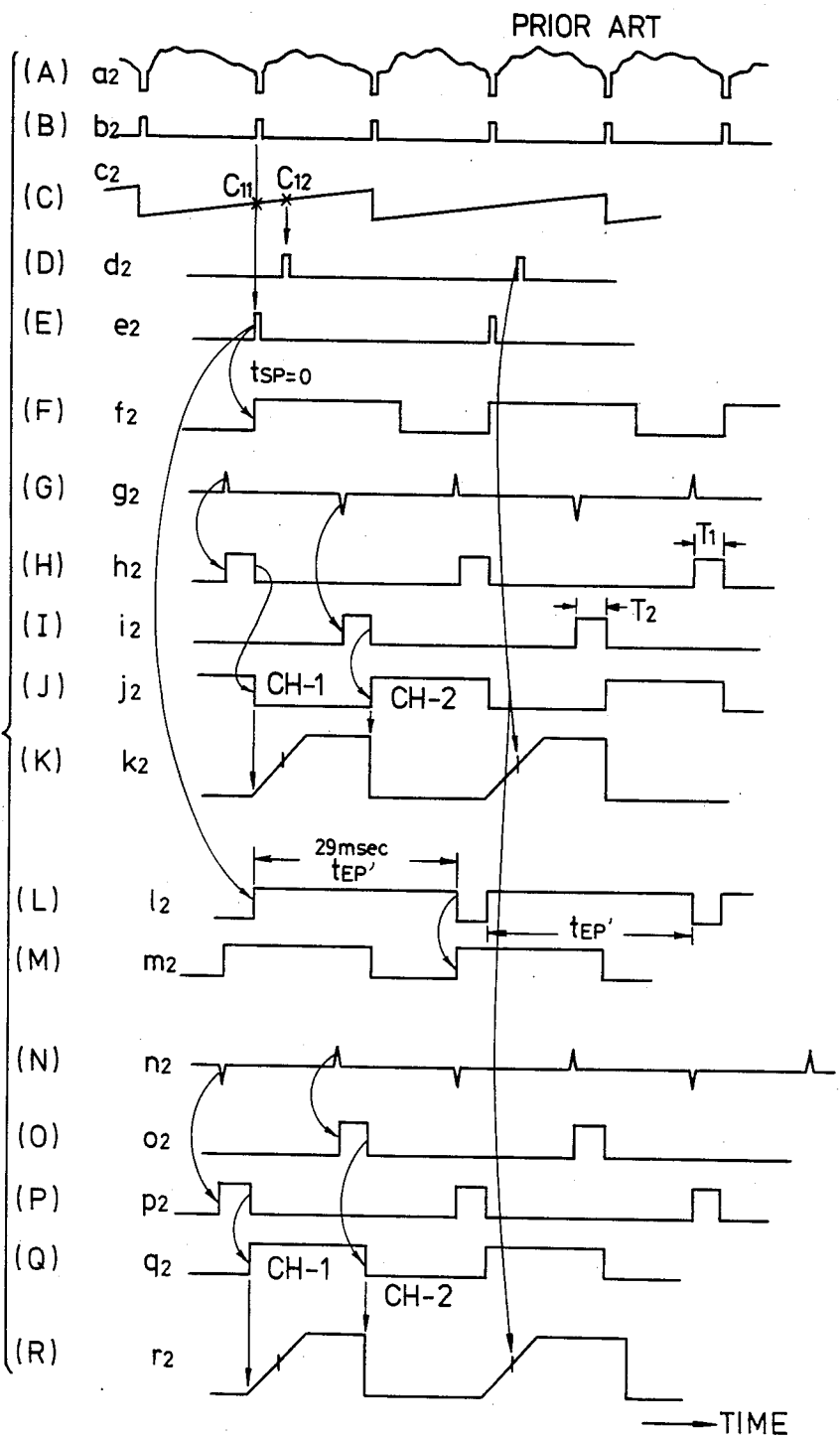
FIGS. 8(A) through 8(R) show signal waveforms for explaining the operation of the block system shown in FIG. 7.

On the other hand, in the expanded play mode, the signal e2 is delayed by a time $t_{EP}$ (29 msec) and is formed into a signal l2 shown in FIG. 8(L) in a monostable multivibrator 57. The signal l2 is shaped into a signal m2 shown in FIG. 8(M) in the shaping circuit 54, and the signal m2 is supplied to the control head 56 via the recording amplifier 55 and is recorded on the magnetic tape.

When P=5 microns, A=58 microns, N=3, T0=16.7 msec and $t_{SP}=0$ are substituted into the equation (1), $t_{EP}$ can be described by $t_{EP}=-(NP/A)T0$, where the minus sign indicates that the timing of the pulses are to be advanced. However, since the timing of the pulses cannot be advanced in actual practice, an equivalent delay time of $t_{EP}=2T0-(NP/A)T0$, is used. The delay time $t_{EP}$ can be described by the following:

$$t_{EP}=2 \times 16.7-(3 \times 5/58) \times 16.7=29 \text{ msec}$$

Accordingly, the delay time of the monostable multivibrator 57 is set to 29 msec.

In the drum servo system, a trigger pulse signal d2 shown in FIG. 8(D) from the terminal C12 of the oscillator circuit 53 is formed into a sampling pulse signal in a sampling pulse generating circuit 58, and the sampling pulse signal is supplied to a phase comparator 60. In the standard play mode, a rotational phase detection pulse signal g2 shown in FIG. 8(G) from the rotational phase detector which detects the rotational phase of a drum motor 63 is supplied to monostable multivibrators 64 and 65 and is formed into signals h2 and i2 shown in FIGS. 8(H) and 8(I). In the expanded play mode, a rotational phase detection pulse signal n2 shown in FIG. 8(N) is supplied to the monostable multivibrators 64 and 65 and is formed into signals o2 and p2 shown in FIGS. 8(O) and 8(P). The output signals h2 and i2 of the monostable multivibrator 64 and 65 are formed into a signal j2 shown in FIG. 8(J) in a flip-flop 66 in the standard play mode. On the other hand, the output signals o2 and p2 of the monostable multivibrators 64 and 65 are formed into a signal q2 shown in FIG. 8(Q) in the flip-flop 66 in the expanded play mode. The output signal of the flip-flop 66 is supplied to a trapezoidal wave generating circuit 59 via an inverter 67 and is formed into a trapezoidal wave signal k2 shown in FIG. 8(K) in the standard play mode. The output signal of the flip-flop 66 is supplied as it is to the trapezoidal wave generating circuit 59 and is formed into a trapezoidal wave signal r2 shown in FIG. 8(R) in the expanded play mode.

The phase comparator 60 compares the phases of the trapezoidal wave signal r2 or k2 and the sampling pulse signal from the sampling pulse generating circuit 58, and produces a phase error signal. The phase error signal is passed through a lowpass filter 61 and a motor driving amplifier 62, and the drum motor 63 is controlled by an output signal of the motor driving amplifier 62.

The operation of the capstan servo system and the operation in the reproducing mode are similar to those of the circuit shown in FIG. 5, and description thereof wll be omitted.

The conventional circuit shown in FIG. 7 requires the monostable multivibrator 57 in the control pulse recording system for providing the relatively long delay of 29 msec between the control pulses f2 for the standard play mode and the control pulses m2 for the expanded play mode, and is easily affected by inconsistencies in the temperature characteristic and the like thereof. In addition, there are problems in that a variable resistor is required to adjust the monostable multivibrator and that the setting of the control pulse recording circuit must be changed between the standard and expanded play modes.

Figure 9:
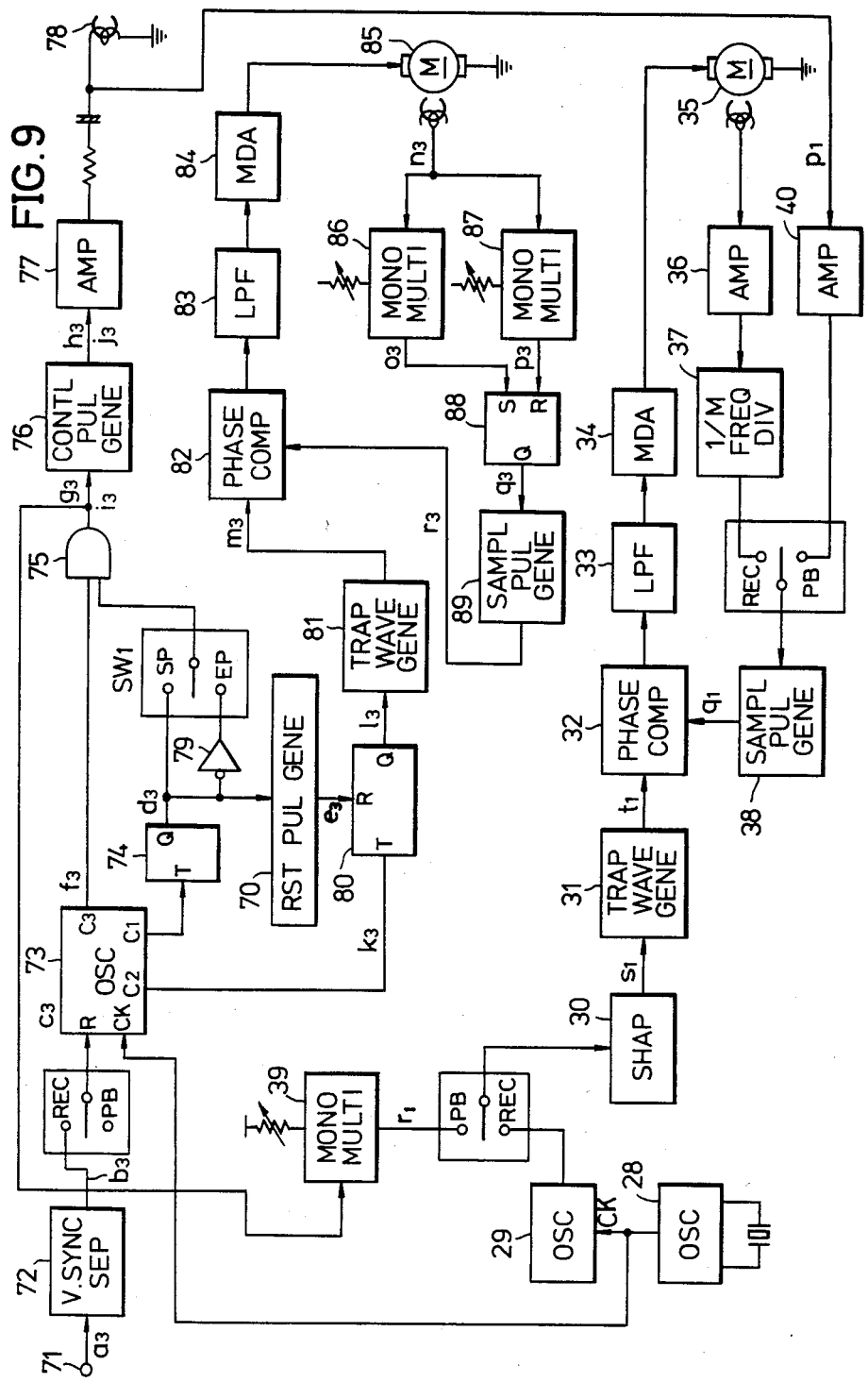
FIG. 9 is a system block diagram showing a first embodiment of the control pulse recording circuit according to the present invention.

FIG. 9 shows the block system of a first embodiment of the control pulse recording circuit according to the present invention. In FIG. 9, those parts which are the same as those corresponding parts in FIG. 5 are designated by the same reference numerals, and description thereof will be omitted. In the recording mode, a video signal a3 shown in FIG. 10(A) which is identical to the video signal a1 is applied to a terminal 71 and is supplied to a vertical synchronizing signal separating circuit 22 wherein a vertical synchronizing signal b3 shown in FIG. 10(B) which is identical to the vertical synchronizing signal b1 is separated. The separated vertical synchronizing signal b3 is supplied to a 60 Hz oscillator circuit (counter) 73 via the switch which is connected to a terminal REC in the recording mode. The oscillator circuit 73 produces a signal c3 shown in FIG. 10(C) from the vertical synchronizing signal b3, and counts clock pulses from the crystal oscillator 28. Threshold values C1, C2 and C3 are set in the oscillator circuit 73, and a signal f3 shown in FIG. 10(F) which has a frequency of 60 Hz is obtained from a terminal C3 thereof, where $C1<C2<C3$. A pulse is produced from the terminals C1, C2 and C3 of the oscillator circuit 73 when the counted value therein reaches the respective threshold values C1, C2 and C3. A signal produced from a terminal C1 of the oscillator circuit 73 is formed into a signal d3 shown in FIG. 10(D) having a frequency of 30 Hz in a flip-flop 74.

Figure 11:
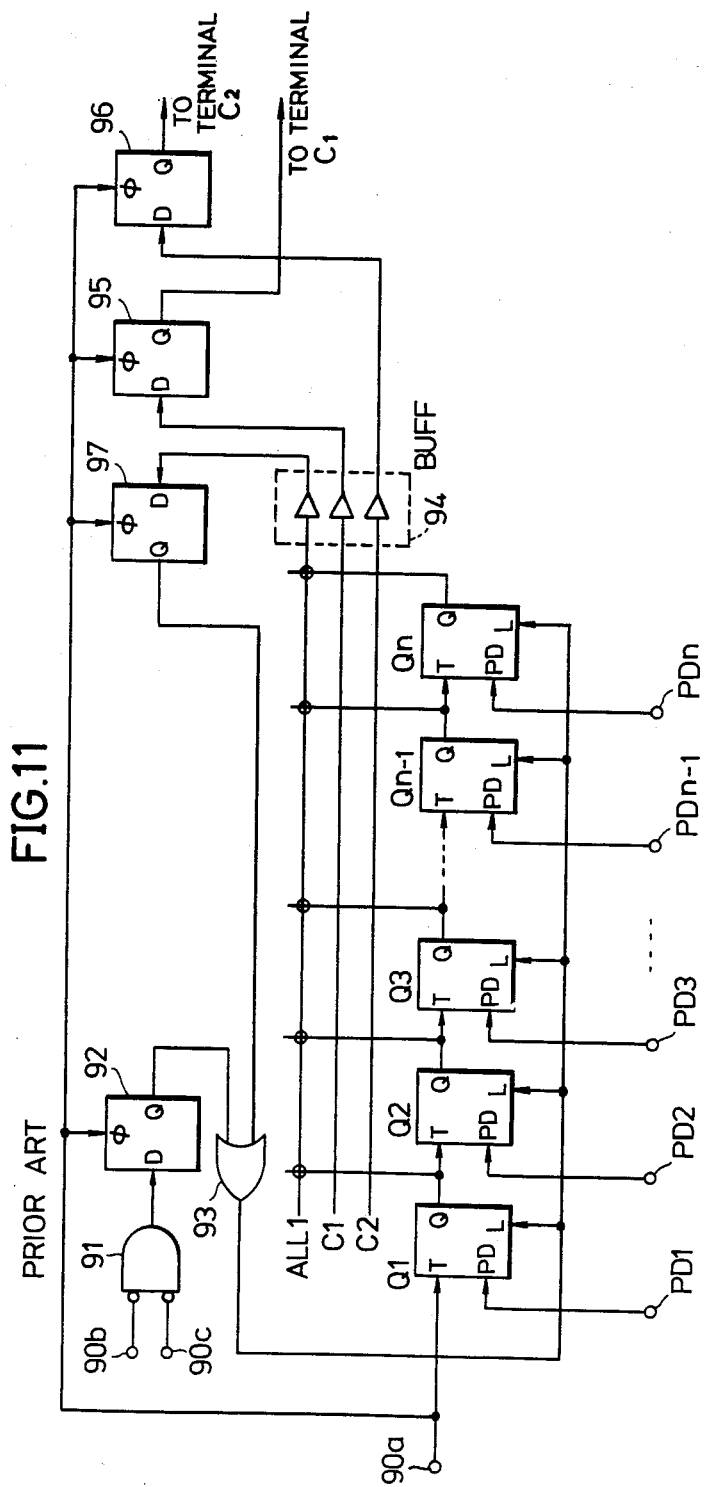
FIG. 11 is a general system circuit diagram showing the construction of an oscillator circuit in the block system shown in FIG. 9.

FIG. 11 shows the general construction of an example of the oscillator circuit (counter) having threshold values set therein. The construction of this oscillator circuit is known. For convenience' sake, it will be assumed that the oscillator circuit is set with two threshold values C1 and C2. In FIG. 11, a clock signal is applied to an input terminal 90a and is supplied to a counter constituted by n flip-flops Q1 through Qn. The separated vertical synchronizing signal is applied to an input terminal 90b, and a pulse signal which has a high level during the recording mode is applied to an input terminal 90c. An output signal of a gate circuit 91 is passed through a delay flip-flop 92 and an OR gate 93, and is supplied to load terminals L of the flip-flops Q1 through Qn. In addition, n-bit preset data in synchronism with the signal applied to the input terminal 89 are supplied to preset data terminals PD of the flip-flops Q1 through Qn from terminals PD1 through PDn and are loaded therein.

Output signals of the flip-flops Q1 through Qn are passed through a buffer 94 constituted by AND gates, and output signals of the buffer 94 are supplied to flip-flops 95 and 96 which respectively produce signals in accordance with the timings with which the threshold values C1 and C2 are reached. When all of the outputs of the flip-flops Q1 through Qn are high, a signal from the buffer 94 is passed through the flip-flop 97 and the OR gate and is applied to the load terminals L of the flip-flops Q1 through Qn.

Figure 10:
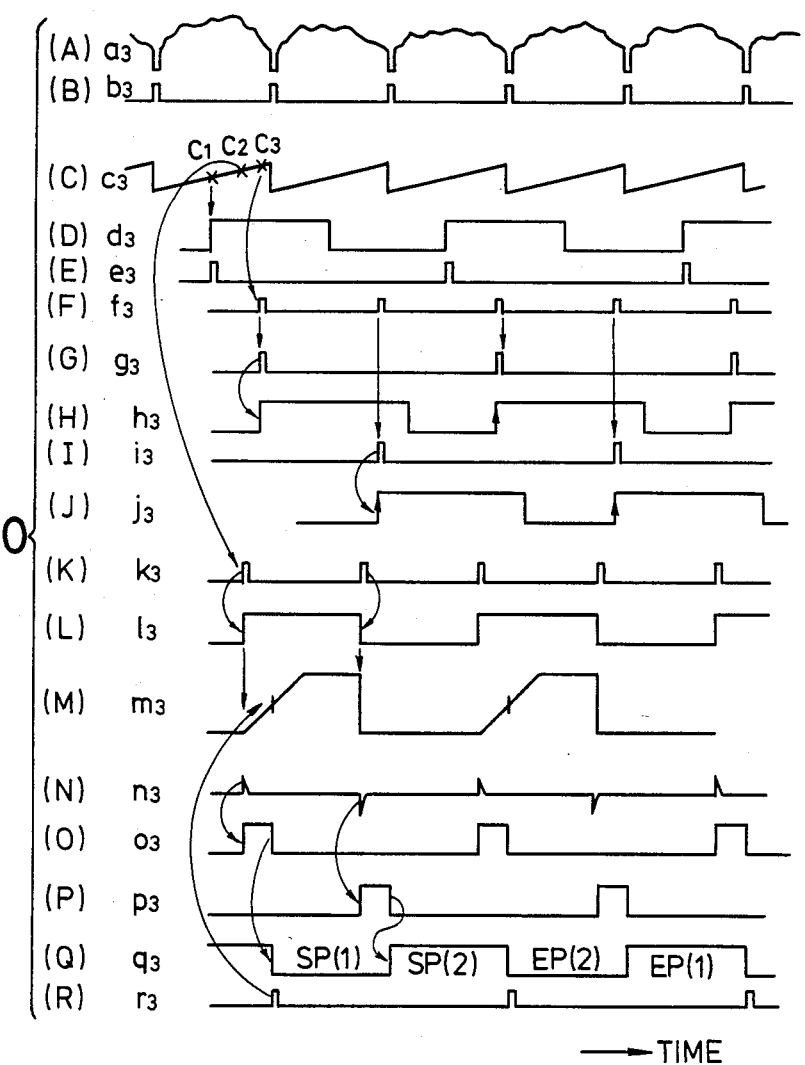
FIGS. 10(A) through 10(R) show signal waveforms for explaining the operation of the block system shown in FIG. 9.

In the standard play mode of the circuit shown in FIG. 9, an AND gate 75 forms a signal g3 shown in FIG. 10(G) from the signals d3 and f3. This signal g3 is formed into control pulses h3 shown in FIG. 10(H) in a control pulse generating circuit 76. On the other hand, in the expanded play mode, the AND gate 75 forms a signal i3 shown in FIG. 10(I) from the signal f3 and an output signal $\overline{d3}$ of an inverter 79 which inverts the signal d3. Hence, the signal i3 is formed into control pulses j3 shown in FIG. 10(J) in the control pulse generating circuit 76. The output control pulses of the control pulse generating circuit 76 are passed through a recording amplifier 77 and are recorded on a magnetic tape (not shown) by a control head 78.

Hence, according to the present embodiment, the 60 Hz signal f3 is produced by use of the 60 Hz oscillator circuit 73, and the signal f3 and the signal d3 or the inverted signal $\overline{d3}$ are supplied to the AND gate 75 by controlling the switching of the switch SW1. As a result, it is possible to obtain the control pulses h3 for the standard play mode and the control pulses j3 for the expanded play mode which are delayed by one field, without having to use a delay circuit as in the case of the conventional circuit.

On the other hand, in the drum servo system, a trigger pulse signal k3 shown in FIG. 10(K) is produced from a terminal C2 of the oscillator circuit 73 and is supplied to a trigger terminal T of a flip-flop 80. The output signal d3 of the flip-flop 74 is formed into a reset pulse signal e3 shown in FIG. 10(E) in a reset pulse generating circuit 70, and the reset pulse signal e3 is supplied to a reset terminal R of the flip-flop 80. Hence, the flip-flop 80 produces a signal l3 shown in FIG. 10(L), and a trapezoidal wave generating circuit 81 forms the signal l3 into a trapezoidal wave signal m3 shown in FIG. 10(M).

A rotational phase detection pulse signal n3 shown in FIG. 10(N) from the rotational phase detector which detects the rotational phase of a drum motor 85 is formed into signals o3 and p3 shown in FIGS. 10(O) and 10(P) in respective monostable multivibrators 86 and 87. A flip-flop 88 forms a signal q3 shown in FIG. 10(Q) from the signals o3 and p3, and a sampling pulse generating circuit 89 forms a sampling pulse signal r3 shown in FIG. 10(R) from the signal q3.

The operation of the capstan servo system is the same as that of the circuit shown in FIG. 5, and description thereof will be omitted.

According to the first embodiment, it is possible to obtain the control pulses for the standard play mode and the control pulses for the expanded play mode, without the use of a delay circuit. Hence, compared to the conventional circuit, the circuit construction is simple and the circuit is inexpensive.

Figure 12:
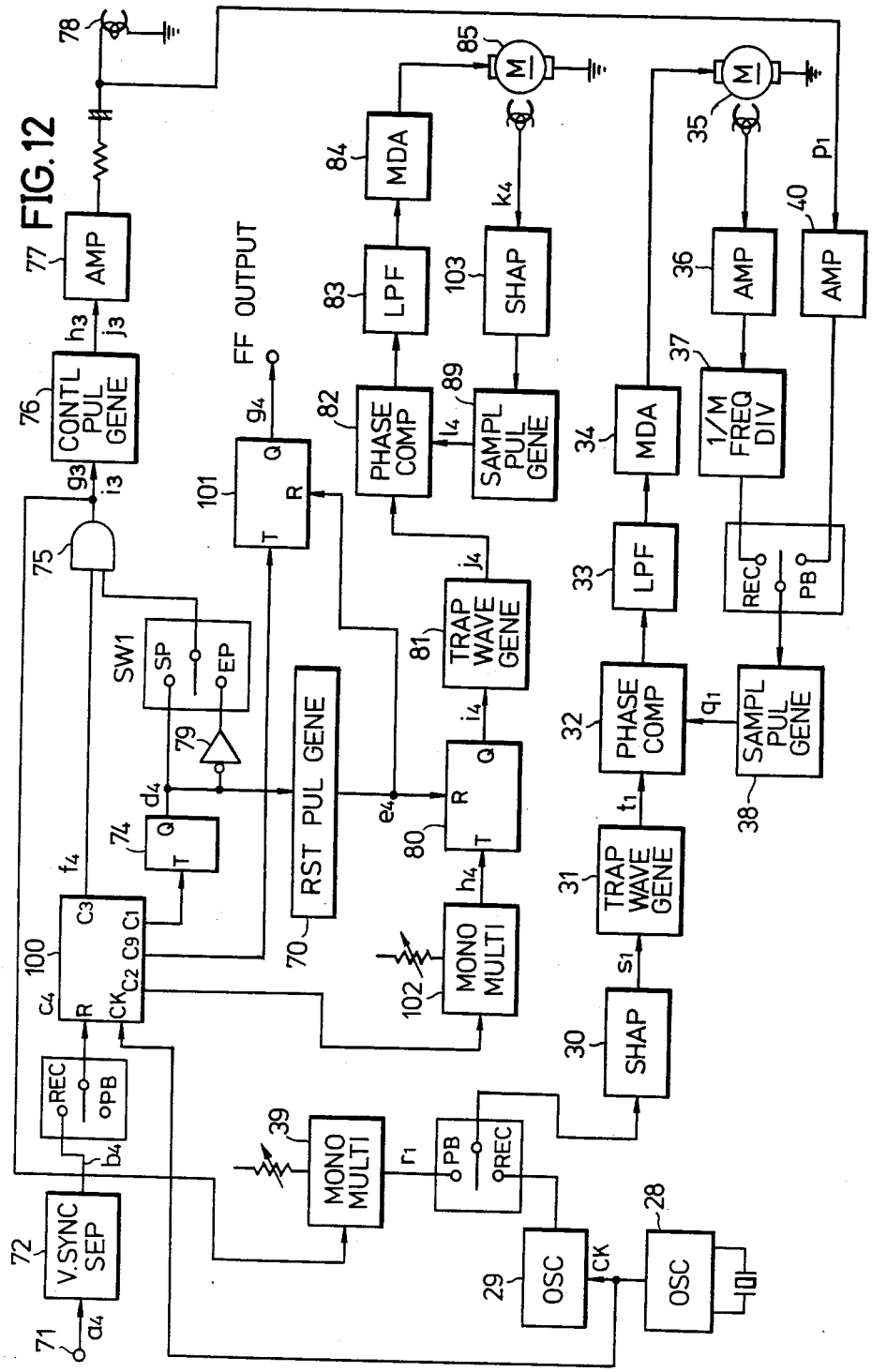
FIG. 12 is a system block diagram showing a second embodiment of the control pulse recording circuit according to the present invention.
Figure 13:
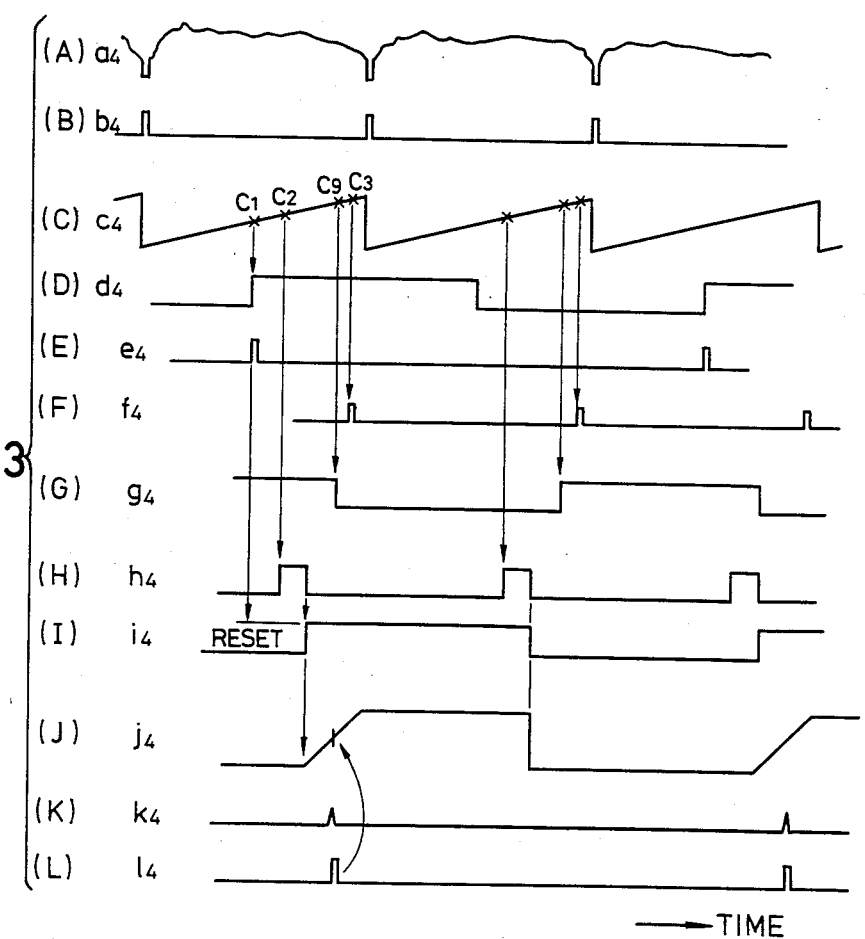
FIGS. 13(A) through 13(L) show signal waveforms for explaining the operation of the block system shown in FIG. 12.

FIG. 12 shows the block system of a second embodiment of the control pulse recording circuit according to the present invention. In FIG. 12, those parts which are the same as those corresponding parts in FIG. 9 will be designated by the same reference numerals, and description thereof will be omitted. A video signal a4 shown in FIG. 13(A) and a vertical synchronizing signal b4 shown in FIG. 13(B) are identical to the video signal a3 and the vertical synchronizing signal b3 described before, respectively. A signal c4 shown in FIG. 13(C) is identical to the signal c3 described before. Threshold values C1, C2, C9 and C3 are set in a 60 Hz oscillator circuit (counter) 100, where $C1<C2<C9<C3$. A signal produced from a terminal C9 of the oscillator circuit 100 is formed into a signal g4 shown in FIG. 13(G) in a flip-flop 101.

A signal produced from the terminal C2 of the oscillator circuit 100 is formed into a signal h4 shown in FIG. 13(H) in a monostable multivibrator 102. The signal h4 is formed into a signal i4 shown in FIG. 13(I) in the flip-flop 80, and the signal i4 is formed into a trapezoidal wave signal j4 shown in FIG. 13(J) in the trapezoidal wave generating circuit 81. A rotational phase detection pulse signal k4 shown in FIG. 13(K) which is produced from the rotational phase detector which detects the rotational phase of the drum motor 85 is passed through a shaping circuit 103 and the sampling pulse generator 89 and is formed into a sampling pulse signal l4 shown in FIG. 13(L). The phase comparator 82 compares the phases of the trapezoidal wave signal j4 and the sampling pulse signal l4.

In the first and second embodiments, it is also possible to obtain the control pulses for the standard and expanded play modes and the trapezoidal wave signal for the drum servo system by the use of only the signal produced from the terminal C2 of the oscillator circuit 73 or 100.

Figure 14:
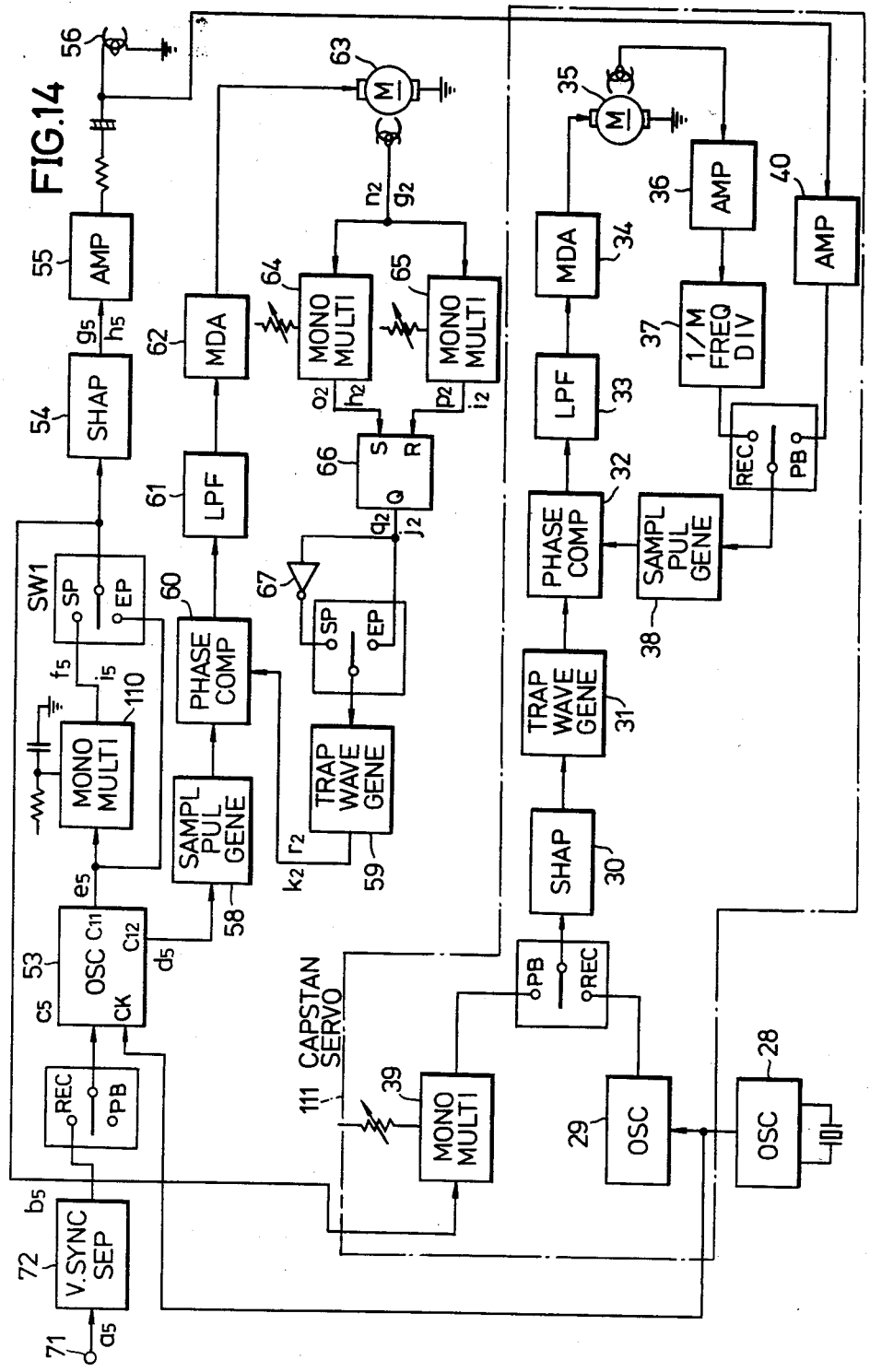
FIG. 14 is a system block diagram showing third and fourth embodiments of the control pulse recording circuit according to the present invention.

FIG. 14 shows the block system of third and fourth embodiments of the control pulse recording circuit according to the present invention. In FIG. 14, those parts which are the same as those corresponding parts in FIG. 7 are designated by the same reference numerals, and description thereof will be omitted. A capstan servo circuit 111 is indicated by a one-dot chain line in FIG. 14. Signals a5, b5, c5, d5 and e5 shown in FIGS. 15(A), 15(B), 15(C), 15(D) and 15(E) are identical to the signals a2, b2, c2, d2 and e2 described before, respectively.

Figure 15:
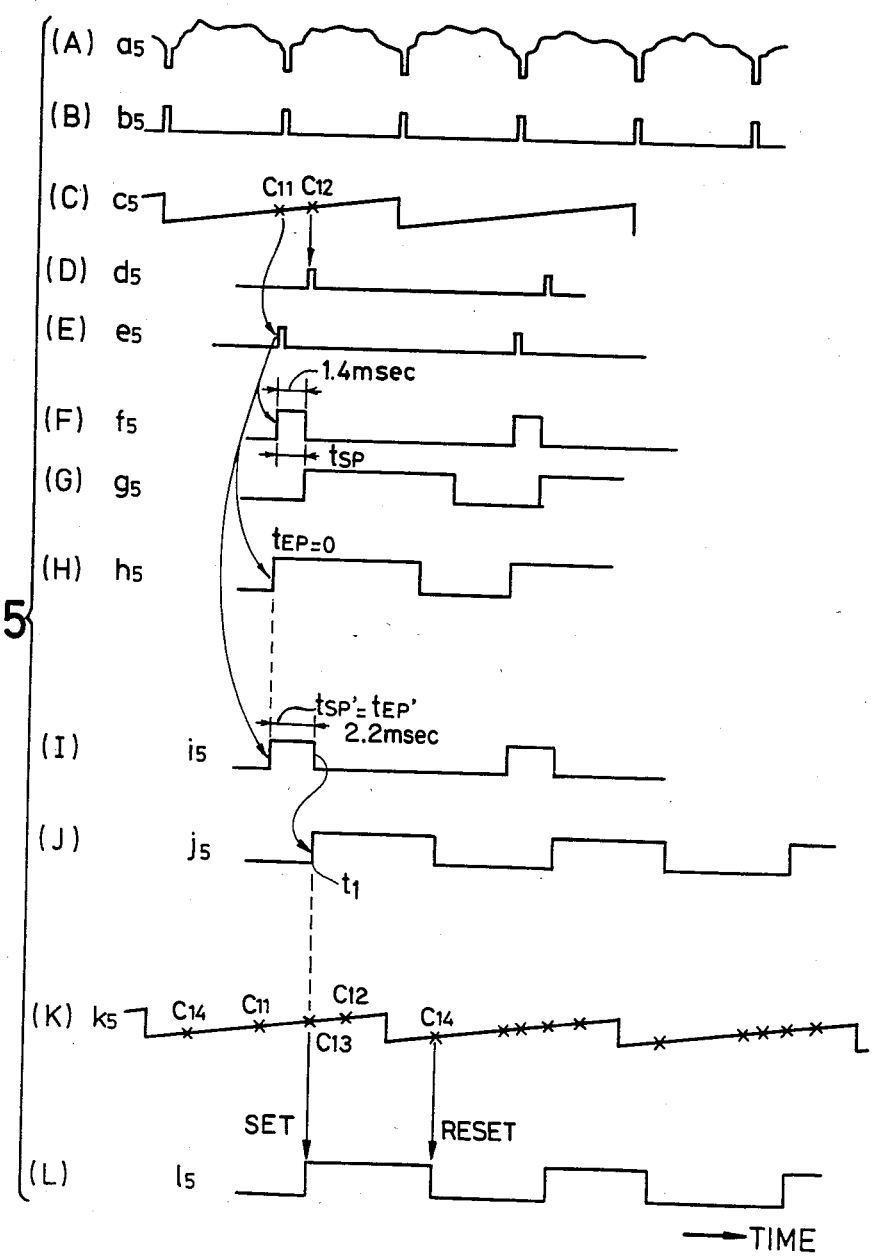
FIGS. 15(A) through 15(L) show signal waveforms for explaining the operation of the block system shown in FIG. 14.

In the standard play mode of the third embodiment, the output signal e5 of the oscillator circuit 53 is delayed by a delay time $t_{SP}$ (1.4 msec) in a monostable multivibrator 110, and an output signal f5 of the monostable multivibrator 110 shown in FIG. 15(F) is supplied to the shaping circuit 54. The shaping circuit 54 shapes the signal f5 into a signal g5 shown in FIG. 15(G).

On the other hand, in the expanded play mode, the signal e5 is supplied to the shaping circuit 54 as it is, and is formed into control pulses h5 shown in FIG. 15(H).

According to the third embodiment, the mechanical X-value is not set to the regular value in the standard play mode nor the expanded play mode. The deviation in the X-value due to the positional adjustment of the control head in the standard play mode is adjusted electrically by the delay time $t_{SP}$. This delay time $t_{SP}$ can be obtained as follows by substituting $t_{EP}=0$ into the equation (1).

$$t_{SP} = (P/A) \times T0 = (5/58) \times 16.7 = 1.4 \text{ msec}$$

Accordingly, the delay time $t_{SP}$ is considerably small compared to the delay time of 29 msec required in the conventional circuit. As a result, virtually no problems will occur even if the delay quantity should become inconsistent due to the temperature characteristic and the like, and furthermore, it is unnecessary to provide a variable resistor for adjusting the monostable multivibrator.

The heights of the video heads change with temperature change, and as a result, the X-value changes depending on the temperature change. Hence, it is possible to provide a temperature sensor on the monostable multivibrator 110 and correct the X-value by varying the time constant thereof depending on the sensed temperature. In this case, the tape speed in the standard play mode is three times that of the expanded play mode, and the electrically correcting quantity in the standard play mode only needs to be one third that of the expanded play mode.

Accordingly, when considering correction from low to high temperatures, it is convenient to set the delay quantity of the monostable multivibrator 110 in the expanded play mode to T0 which is one half the input period 2T0. Hence, the following equation (2) can be obtained from the equation (1).

$$t_{SP} = (t_{EP}/N) + (P/A) \times T0 \qquad (2)$$

When the expanded play mode is set so that $t_{EP}=T0=16.7$ mesc, $t_{SP}=7$ msec. Of course, the value of the X-value is for the case where the standard magnetic tape for the standard play mode is played in the standard play mode.

In the case where $t_{SP} \neq 0$, the following equation can be obtained from the equations (1) and (2), and the delay times $t_{SP}$ and $t_{EP}$ respectively for the standard and expanded play modes can be set arbitrarily.

$$t_{EP} = Nt_{SP} - (NPT0/A)$$

According to the fourth embodiment, the delay time of the monostable multivibrator 110 is set to 2.2 msec. Hence, a signal i5 shown in FIG. 15(I) is produced from the monostable multivibrator 110. Furthermore, in the fourth embodiment, the switch SW1 is connected to the terminal SP in both the standard and expanded play modes. Consequently, the shaping circuit 54 produces control pulses j5 shown in FIG. 15(J) from the signal i5. The delay time of the monostable multivibrator 110 can be described by the following equation by setting $t_{SP}=t_{EP}$ from the equation (1).

$$\begin{aligned} t_{SP} &= t_{EP} \\ &= (1 - (1/N)) - 1 \times (P/A) \times T0 \\ &= (1 - (1/N)) - 1 \times (5/58) \times 16.7 \\ &= 2.2 \text{ msec} \end{aligned}$$

Hence, as in the case of the third embodiment, the mechanical X-value is not set to the regular value in the standard play mode nor the expanded play mode. The deviation in the X-value due to the positional adjustment of the control head in the standard play mode is adjusted electrically by the delay time $t_{SP}$. According to the fourth embodiment, virtually no problems will occur even if the delay quantity should become inconsistent due to the temperature characteristic and the like, and furthermore, it is unnecessary to provide a variable resistor for adjusting the monostable multivibrator. In addition, it is unnecessary to provide switches for changing the setting between the standard and expanded play modes.

Figure 16:
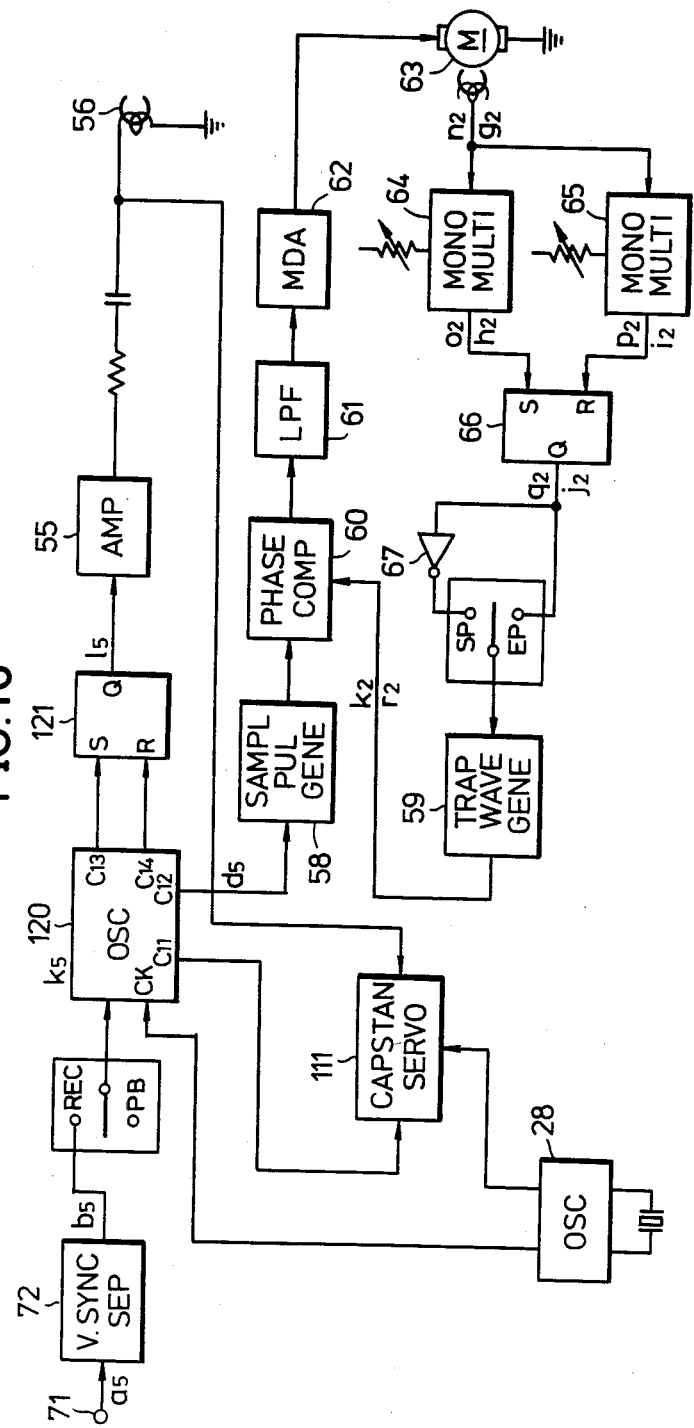
FIGS. 16 and 17 are system block diagrams showing fifth, sixth and seventh embodiments of the control pulse recording circuit according to the present invention.

FIG. 16 shows the system block diagram of a fifth embodiment of the control pulse recording circuit according to the present invention. In FIG. 16, those parts which are the same as those corresponding parts in FIGS. 7 and 14 will be designated by the same reference numerals, and description thereof will be omitted. An oscillator circuit (counter) 120 produces a signal k5 shown in FIG. 15(K) having a frequency of 30 Hz. Threshold values C11 through C14 are set in the oscillator circuit 120, where C14<C11<C13<C12. The timing of the threshold value C13 coincides with a rising timing t1 of the signal j5 shown in FIG. 15(J) of the fourth embodiment. The time period in which the threshold values C11 through C14 are obtained is set equal to a high-level period of the signal j5.

A flip-flop 121 is set by the signal from the terminal C13 of the oscillator circuit 120 and is reset by the signal from the terminal C14. As a result, control pulses l5 shown in FIG. 15(L) are produced from the flip-flop 121. In this fifth embodiment, the control pulses l5 are used both in the standard and expanded play modes as in the case of the fourth embodiment.

Figure 17:
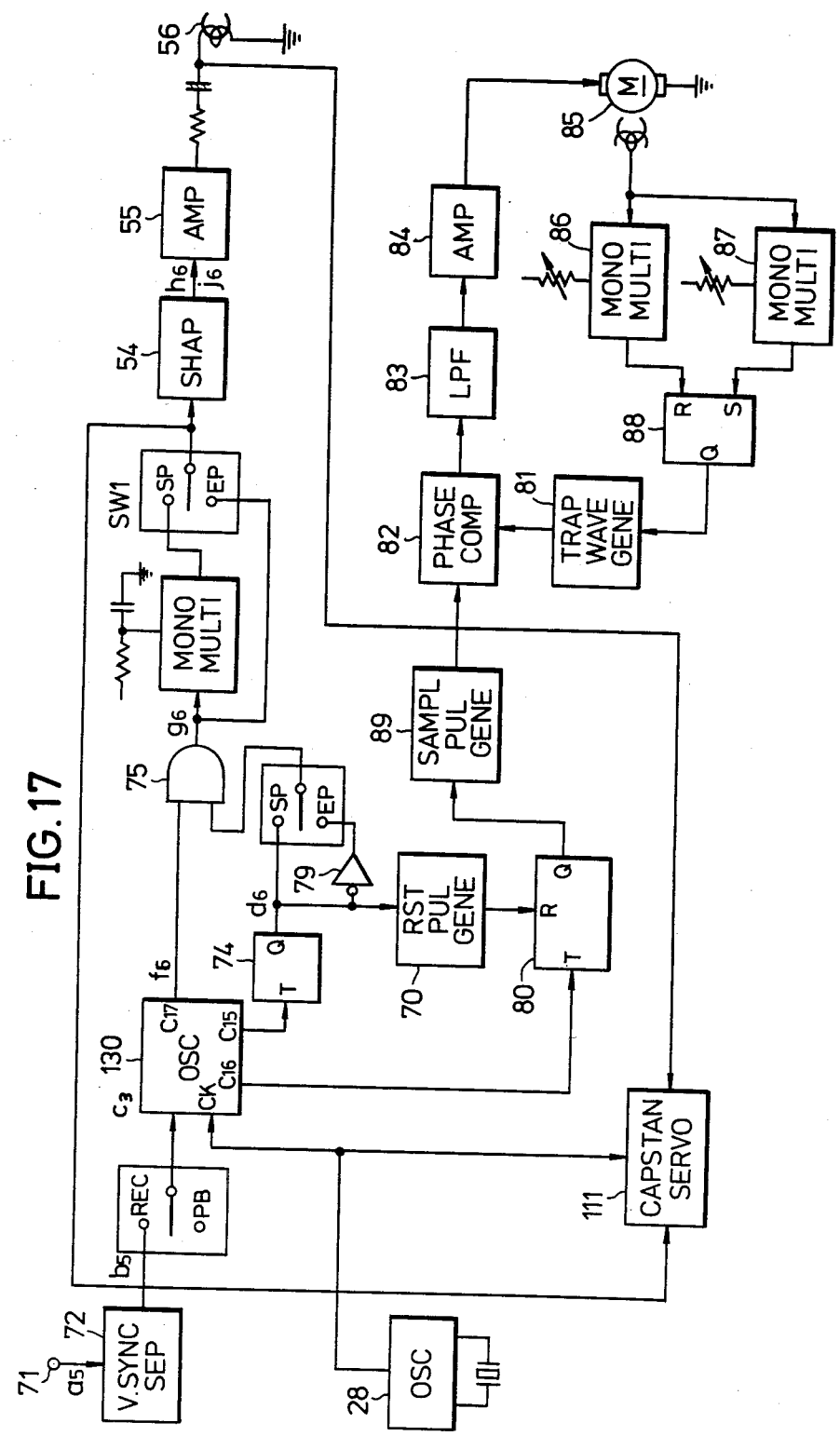

FIG. 17 shows the block system of sixth and seventh embodiments of the control pulse recording circuit according to the present invention. In FIG. 17, those parts which are the same as those corresponding parts in FIGS. 7, 9, 14 and 16 are designated by the same reference numerals, and description thereof will be omitted. Description will be given with respect to the sixth embodiment for the recording mode. The vertical synchronizing signal b5 shown in FIG. 15(B) is formed into the signal c3 shown in FIG. 10(C) in a 60 Hz oscillator circuit (counter) 130. Threshold values C15, C16 and C17 are set in the oscillator circuit 130, where C15<C16<C17. A signal d6 having a frequency of 30 Hz is produced from a terminal C15 of the oscillator circuit 130. On the other hand, a signal f6 having a frequency of 60 Hz is produced from a terminal C17 of the oscillator circuit 130.

In the standard play mode, the signals d6 and f6 are formed into a 30 Hz signal g6 in the AND gate 75. The signal g6 is delayed by 1.4 msec in the monostable multivibrator 110, and an output signal of the monostable multivibrator 110 is formed into control pulses h6 which are identical to the control pulses g5 shown in FIG. 15(G) in the shaping circuit 54. On the other hand, in the expanded play mode, the signal f6 and an inverted signal $\overline{d6}$ which has been inverted in the inverter 79 are formed into a signal i6 in the AND gate 75. In this case, the shaping circuit 54 produces control pulses j6 which are identical to the control pulses h5 shown in FIG. 15(H).

In the seventh embodiment, the delay time of the monostable multivibrator 110 is set to 2.2 msec, and the switch SW1 is constantly connected to the terminal SP in both the standard and expanded play modes. Hence, control pulses identical to the control pulses j5 shown in FIG. 15(J) are obtained. The seventh embodiment is in correspondence with the fourth embodiment.

According to the sixth and seventh embodiments, the delay time of the delay circuit can be set to a small value compared to that of the conventional circuit. Hence, the circuit is virtually unaffected by inconsistencies in the temperature characteristic and the like, and furthermore, it is unnecessary to provide switches for changing the setting between the standard and expanded play modes. Therefore, the circuit construction is simple compared to that of the conventional circuit.

Further, the present invention is not limited to these embodiments, but various variations and modifications may be made without departing from the scope of the present invention.

What is claimed is:

1. A control pulse recording circuit for a magnetic recording and reproducing apparatus, said magnetic recording and reproducing apparatus comprising recording and reproducing means including two pairs of video heads for recording and reproducing a video signal on and from a magnetic tape by selectively switching and using one pair of video heads depending on a moving speed of the magnetic tape, each pair of video heads comprising video heads having gaps of mutually different azimuth angles; and separating means for separating a vertical synchronizing signal from the video signal supplied to said separating means, said control pulse recording circuit comprising:

oscillator means for generating a predetermined signal having a predetermined frequency which is higher than that of the vertical synchronizing signal;

counter means supplied with the predetermined signal from said oscillator means and the vertical synchronizing signal from said separating means, for counting the predetermined signal, said counter means being reset by the vertical synchronizing signal in a recording mode and running free at an oscillation frequency of 30 Hz in a reproducing mode, said counter means producing a 30 Hz signal when a counted value in said counter means reaches a threshold value, said 30 Hz signal being produced with a timing which has been delayed by a predetermined time from every other vertical synchronizing signal in the recording mode irrespective of the selective use of the pairs of video heads in said recording and reproducing means;

circuit means supplied with said 30 Hz signal from said counter means for producing 30 Hz control pulses; and control head means coupled to said circuit means for recording the 30 Hz control pulses on the magnetic tape in the recording mode, the 30 Hz control pulses being recorded on the magnetic tape with a timing delayed by a delay time $t_{SP}$ from a timing of said every other vertical synchronizing signal in both first and second modes, so that a deviation in an X-value caused by a positional adjustment of said control head means in said first mode is corrected by said delay time $t_{SP}$, the moving speed of the magnetic tape in said first mode being faster than that of said second mode, said delay time $t_{SP}$ being described by $t_{SP}=t_{EP}=(1-(1/N))^{-1}\times(P/A)\times T0$, where A denotes a track pitch of the video heads in said first mode, 1/N denotes a ratio of the moving speeds of the magnetic tape between said first and second modes, P denotes a difference C0−C1 between an actual difference C1 and an ideal difference C0 between relative height positions of the video heads with respect to a reference height position, and T0 denotes a field period, said X-value being a distance on said magnetic tape from one of said video heads which terminated a scan on the magnetic tape and said control head means, said ideal difference C0 being obtained when said X-value is set to a regular value.

2. A control pulse recording circuit as claimed in claim 1 in which said counter means has at least first and second threshold values set therein and produces control pulses in synchronism with said first and second threshold values.

* * * * *